(12) United States Patent
Murakami et al.

(10) Patent No.: US 6,556,567 B1
(45) Date of Patent: Apr. 29, 2003

(54) METHOD AND SYSTEM FOR MULTIPLEXING PACKETS

(75) Inventors: Yasuo Murakami, Yokohama (JP); Takaaki Toyama, Fujisawa (JP); Masahide Minowa, Yokohama (JP); Nobuyuki Yamamoto, Yokohama (JP); Tetsuo Kano, Fujisawa (JP); Yusho Futami, Yokohama (JP); Yoshihiro Sakae, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/265,219

(22) Filed: Mar. 1, 1999

(30) Foreign Application Priority Data

Nov. 26, 1998 (JP) .......................................... 10-350791

(51) Int. Cl.$^7$ .............................................. H04L 12/56
(52) U.S. Cl. ....................................... 370/394; 370/537
(58) Field of Search .......................... 370/395.1, 395.4, 370/395.42, 395.43, 433, 437, 461, 462, 468, 532, 537, 538, 540, 394, 474

(56) References Cited

U.S. PATENT DOCUMENTS

| | | | | |
|---|---|---|---|---|
| 4,914,650 A | * | 4/1990 | Sriram | 370/235 |
| 4,993,022 A | * | 2/1991 | Kondo et al. | 370/431 |
| 5,249,185 A | * | 9/1993 | Kanno et al. | 370/465 |
| 5,497,371 A | * | 3/1996 | Ellis et al. | 370/394 |
| 5,509,007 A | * | 4/1996 | Takashima et al. | 370/389 |
| 5,617,416 A | * | 4/1997 | Damien | 370/391 |

OTHER PUBLICATIONS

"B–IDSN ATM Adaptation layer specification: Type 2 AAL," International Telecommunication Union Recommendation I.363.2.

"Voice over Frame Relay Implementation Agreement" FRF.11.

"Traffic Management specification Version 4.0," The ATM Forum Technical Committee, Apr. 1996.

Coding of Speech at 8kbits Using Conjugate–Structure Algebraic–Code–Excited Linear–Prediction (CS–ACELP), International Telecommunication Union Recommendation G. 729– Annex B.

Japanese Patent Application Publication No. 10–313315, Published Nov. 24, 1998 (Translation not yet published).

English Translation of the Abstract of Japanese application No. 10–233784, Published Sep. 2, 1998.

"Implementation of AA L2 for Low Bit–Rate Voice over ATM" ISS 1997, pp. 271–276.

* cited by examiner

Primary Examiner—Kwang Bin Yao
(74) Attorney, Agent, or Firm—Sofer & Haroun, LLP

(57) ABSTRACT

A method and a system for multiplexing voice packets without delay variation even if the number of multiplexed channels is increased, wherein a packet buffering unit receives compressed voice data, and stores voice data groups during voice activity intervals in each channel as talk; a scheduling FIFO block sequentially stores the channel numbers of a predetermined number of multiplexed channels which are read according to priority over the other channels, thereby controlling reading contention. A write decision block controls writing of talk spurts in the buffer areas of the respective channels in a packet buffering unit and also controls writing of the channel numbers in the scheduling FIFO block. A scheduling FIFO controller selects channel numbers from the scheduling FIFO block and a read decision block outputs voice packets by controlling the multiplexing sequence of talk spurts of the selected channel numbers.

7 Claims, 15 Drawing Sheets

FIG.7
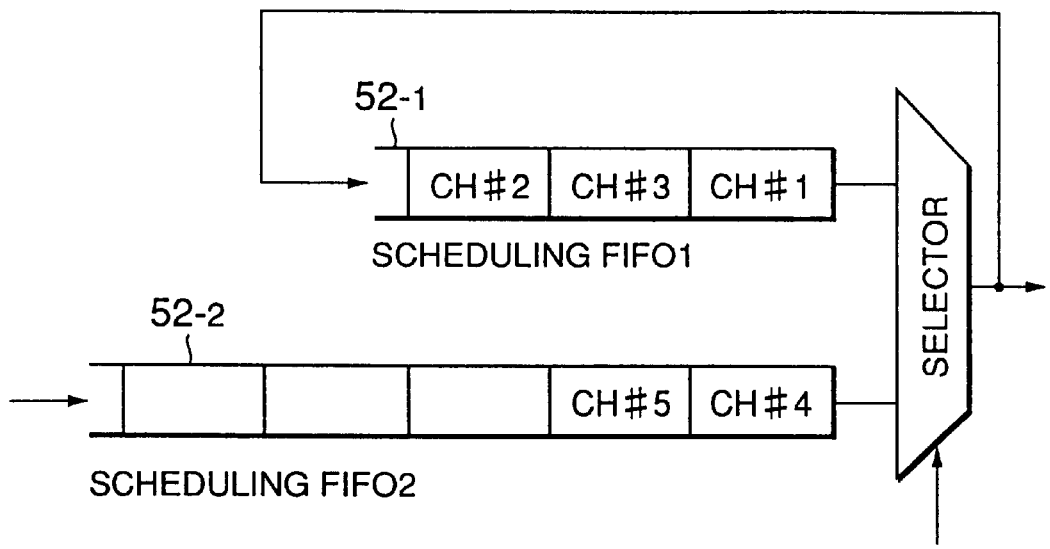
BEFORE CHANNEL NUMBER 1 IS READ
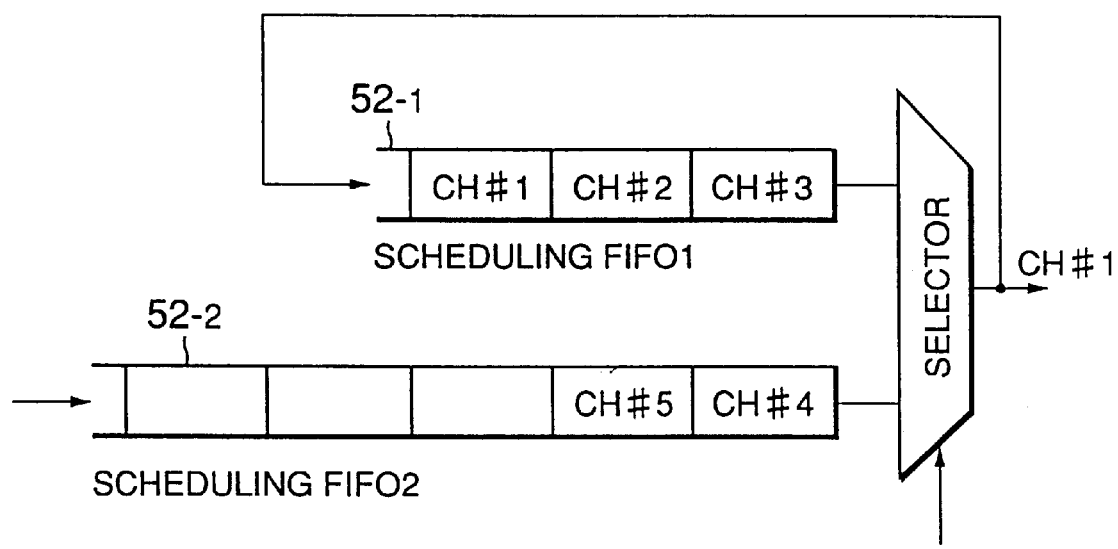
AFTER CHANNEL NUMBER 1 IS READ
INTERNAL STATE OF SCHEDULING FIFO AT TIME A

FIG.8
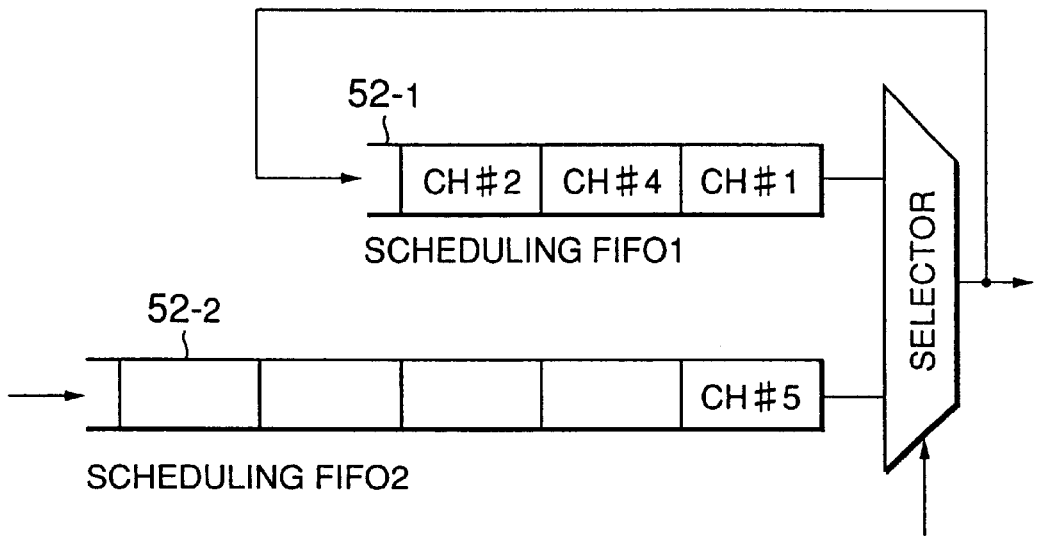
BEFORE CHANNEL NUMBER 1 IS READ
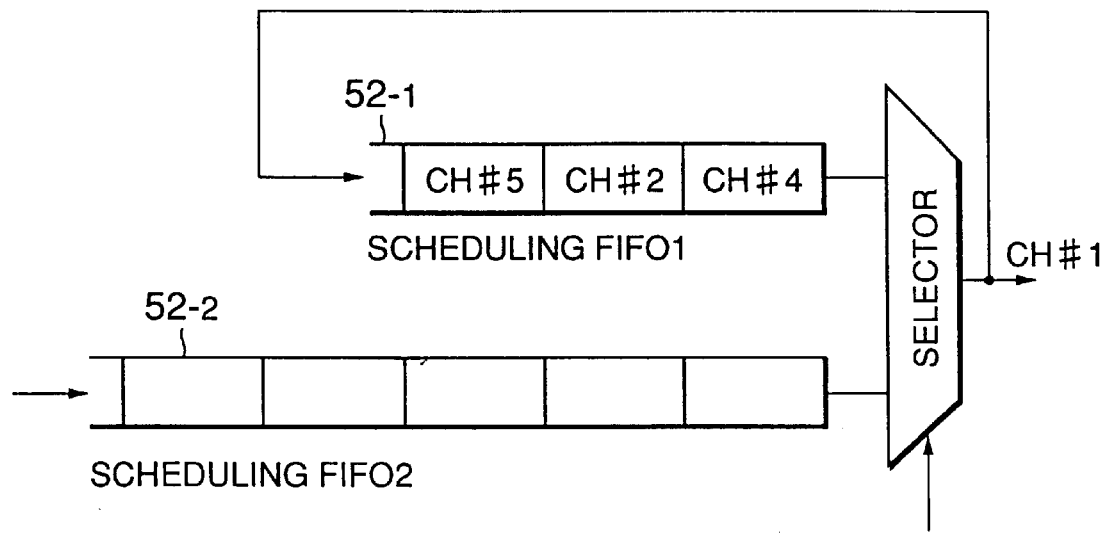
AFTER CHANNEL NUMBER 1 IS READ
INTERNAL STATE OF SCHEDULING FIFO AT TIME B

FIG.9
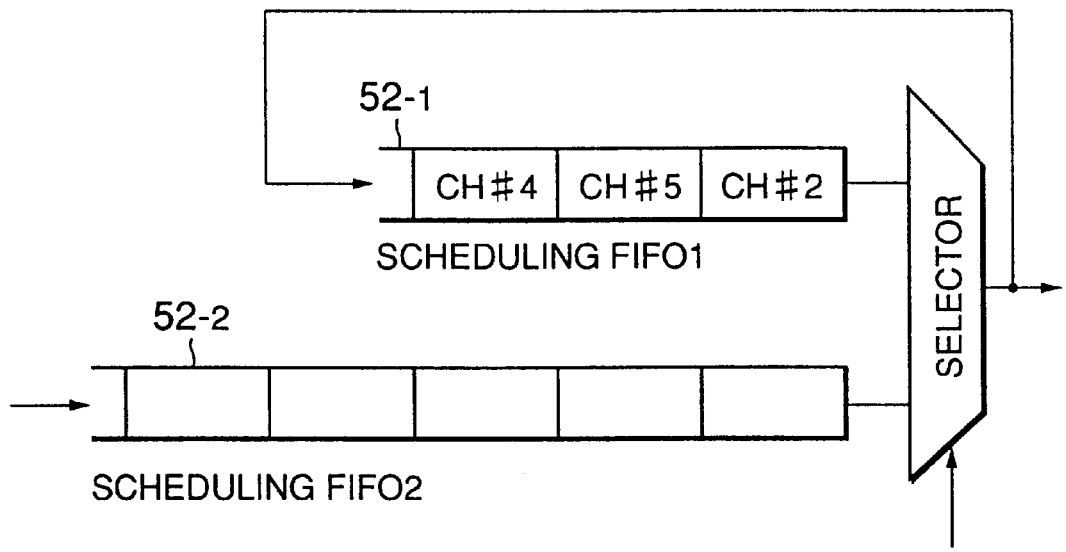
BEFORE CHANNEL NUMBER 2 IS READ
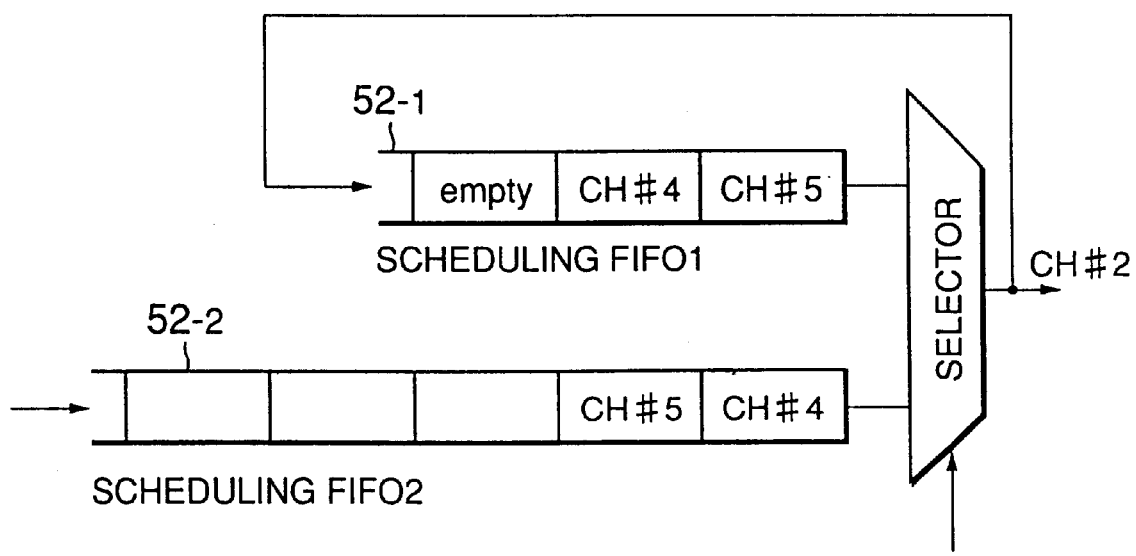
AFTER CHANNEL NUMBER 2 IS READ
INTERNAL STATE OF SCHEDULING FIFO AT TIME C

FIG.10
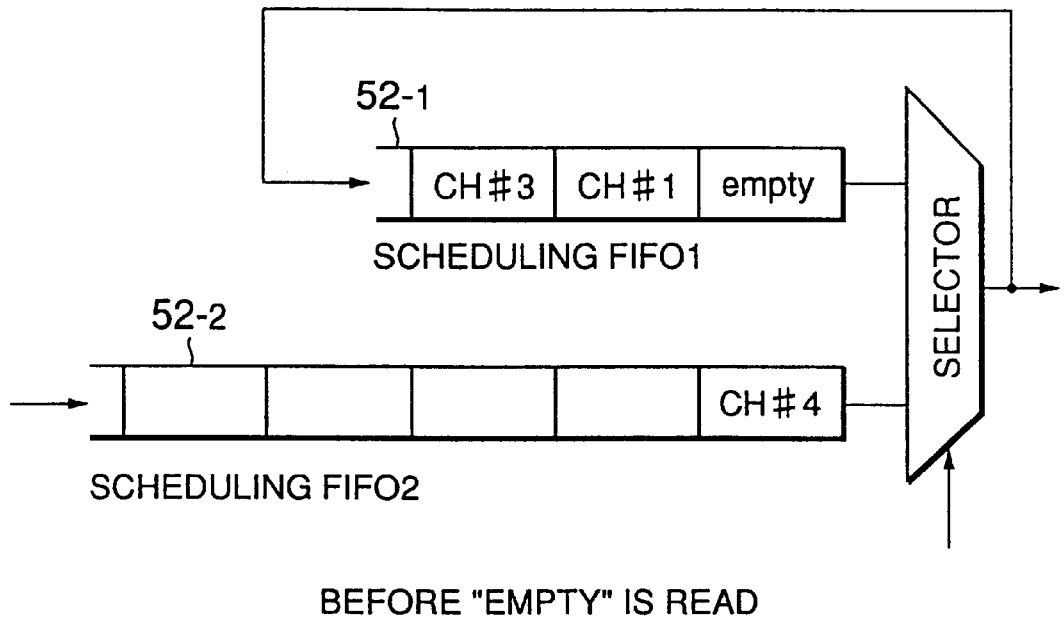
BEFORE "EMPTY" IS READ
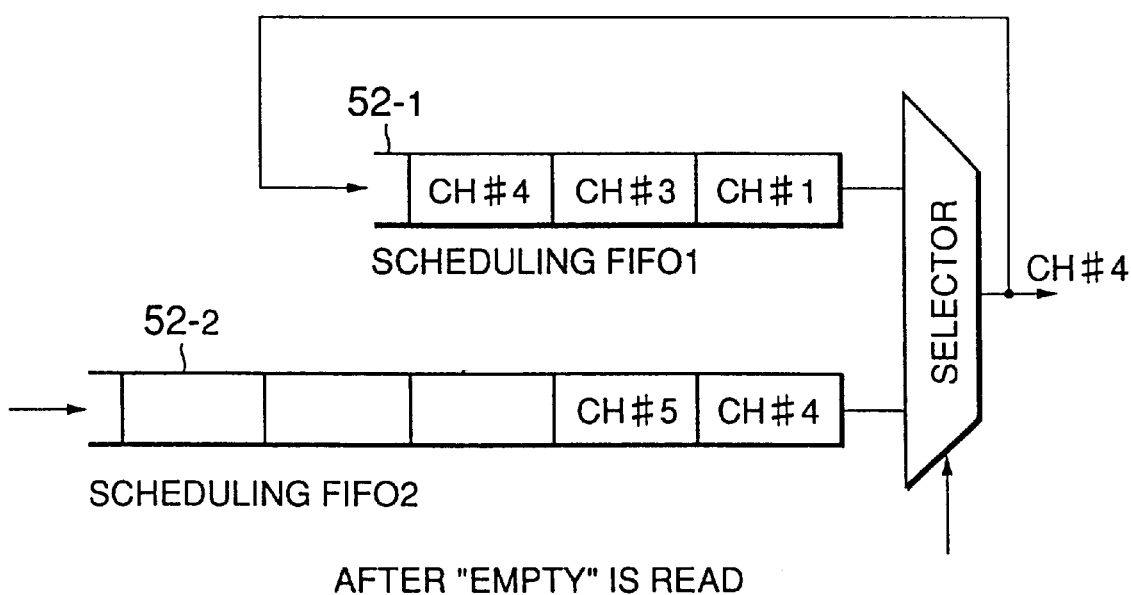
AFTER "EMPTY" IS READ
INTERNAL STATE OF SCHEDULING FIFO AT TIME D

METHOD AND SYSTEM FOR MULTIPLEXING PACKETS

BACKGROUND OF THE INVENTION

1. Field of the Invention

The present invention relates to a method and a system for multiplexing voice or sound packets (hereafter referred to as voice packets), and more particularly to a method and a system for multiplexing packets with higher transfer efficiency and less delay variation of voice packets by controlling the sequence of multiplexing groups of voice activity data (hereafter referred to as talk spurts) that occurs during voice activity intervals in each channel when voice data of a plurality of channels is multiplexed.

2. Description of Related Art

In private networks, mobile communication networks or the like, speech processing, such as low bit rate speech coding and silence compression, is widely used for efficient utilization of limited line capacity. Most of the current standardized speech coding algorithms at not higher than 8 kbit/s have been designed to output compressed voice information of several tens or hundreds of bits in a burst in a voice frame. For example, in CS-ACELP (Conjugate Structure—Algebraic Code Excited Linear Prediction, ITU-T (International Telecommunication Union—Telecommunication standardization sector) Recommendation G.729), compressed voice information of 10 bytes is output in every 10-ms voice frame.

When voice information coded at such a low bit rate is transmitted on an ATM (Asynchronous Transfer Mode) network or a frame relay network, specifically, on an ATM network, for example, the delay time (cell assembly delay) by accumulation of voice information of one channel corresponding to one cell increases in proportion to a decrease in bit rate. To cite an example, the cell assembly delay is 6 ms for voice at 64 kbit/s, but the cell assembly delay is as long as about 50 ms for voice at 8 kbit/s. To reduce the cell assembly delay, it is only necessary to decrease the data storage length of the payload in a cell, but the transmission efficiency decreases in proportion to the reduction of the data storage length.

With this as a backdrop, ITU-T inquired into the method of decreasing the cell assembly delay by dividing voice information coded at a low bit rate into packets and storing compressed voice packets of a plurality of channels into the payload of an ATM cell, and issued a recommendation "AAL type 2 (ATM Adaptation Layer type 2, ITU-T Recommendation I.363.2)". For a frame relay service, there is "Voice over Frame Relay Implementation Agreement FRF.11", which provides a transfer method specification that compressed voice information at low bit rate is divided into sub-frames, and a frame formed of sub-frames of several channels is transferred. By the transfer methods provided in AAL type 2 and FRF.11, it is possible to reduce cell assembly delay or frame assembly delay, and implement high-efficiency transmission. When each compressed voice information is formed into packets or sub-frames, silence compression technique can be applied, so that bandwidth reduction effects can be expected. The silence compression is a voice coding technique, which does not output compressed voice information during silence intervals, as recommended in ITU-T G.729 Annex B, for example.

FIG. 15 is a diagram for explaining the operation of multiplexing silence compressed voice packets in a prior art.

As shown in FIG. 15, in the conventional silence compressed voice packet-multiplexing method, packets are formed by adding a packet header to each data element of compressed voice information, which belongs to channels CH1, CH2 and CH3. Next, by putting packets (of three channels in this example) into the payload of an ATM cell in the generation order of packets, and adding a cell header to the payload, the ATM cell is formed, which includes voice information of a plurality of channels. Voice packets are prevented from being generated during silence intervals. According to the method described above, when the silence rate is 50% (the percentage of silence intervals in voice data is 50%), for example, a bandwidth reduction effect of 50% can be theoretically obtained if overhead, such as packet headers and a cell header, is disregarded.

SUMMARY OF THE INVENTION

When silence compressed voice packets of a plurality of channels are multiplexed on an ATM network or a frame relay network, as described above, a bandwidth reduction effect according to the silence rate can be obtained. However, whether voice information in a channel is a voice activity interval or a silence interval is influenced by statistical factors. There may be a case where voice information of all channels is voice activity intervals and compressed voice packets is generated simultaneously. Conversely, there may also be a case where voice information of all channels may be silence intervals and compressed voice packets are not generated at all.

More specifically, when silence compressed voice packets of a plurality of channels are multiplexed, as in the prior art, if packets are multiplexed in their order of generation, the traffic characteristic of multiplexed data output is VBR (Variable Bit Rate). For this reason, when a limited bandwidth is used efficiently or when the bandwidth for multiplexed data output is set by CBR (Constant Bit Rate) to secure a voice bandwidth because it is difficult to control it by rt-VBR (real time VBR) control, delay variations occur between compressed voice packets in each channel. The important thing here is to increase the number of channels to be multiplexed to make effective use of the limited line capacity. However, the more the number of multiplexed channels increases, the more delay variations increase. ATM Forum Traffic Management Specification Version 4.0 stipulates VBR, rt-VBR, and CBR.

When silence compressed voice packets of a plurality of channels are multiplexed in the order of their generation as mentioned above, delay variations occur between the compressed voice packets in each channel, so that voice on the receiving side is drawn out or broken intermittently, thus deteriorating reproduced voice quality. As means for damping out delay variations on the receiving side, there is a fixed delay addition process, for example. By this process, after the first compressed voice packet is received, data is buffered for a fixed length of time and added with a fixed delay, then compressed voice packets are successively decoded and reproduced at fixed intervals. In any case, a variation-damping buffer is required on the receiving side, which is in proportion to the magnitude of delay variations, to prevent voice quality deterioration due to delay variations between the compressed voice packets.

As has been described, when silence compressed voice packets of a plurality of channels are multiplexed in the order of their generation, there is a trade-off between the utilization efficiency of the output port and delay variations of compressed voice packets of each channel. To be more specific, as the number of multiplexed channels is increased to improve the utilization efficiency of the output port, the delay variations of the compressed voice packets increase. Therefore, the buffer on the receiving side must be large enough to damp out the delay variations of the compressed voice packets in each channel.

The present invention has been made with the above problem in mind and has as its object to prevent delay variations from occurring between the voice packets in each channel even if the number of channels multiplexed is increased to improve the utilization efficiency of the output port when a plurality of voice packets, particularly, silence compressed voice packets, are multiplexed.

To achieve the above object, in the present invention, a decision is made as to whether or not a packet is multiplexed for every talk spurts of each channel, so that the multiplexed packets are prevented from being output faster than the bit rate of the output port.

By this arrangement, delay variations do not occur among the compressed voice data in the talk spurts of each channel. Moreover, the capacity of the delay variation damp-out buffer on the receiving side can be reduced without deteriorating voice quality on the receiving side.

Details of the present invention will be described in specific in the following.

According to the present invention, there is provided a packet multiplexing method for multiplexing voice activity data groups input in each channel, each group including voice data occurring during voice activity intervals, comprising the steps of:

selecting a number of channels not greater than a predetermined number of channels that can be multiplexed at a time from among channels corresponding to input voice activity data groups; and multiplexing voice data of the voice activity data groups of selected channels and outputting multiplexed voice packets.

According to the present invention, there is also provided a packet multiplexing system for multiplexing voice activity data groups input in each channel, each group including voice data during voice activity intervals, comprising:

a packet buffering unit for storing input voice activity data groups;

a scheduler for sequentially storing channel numbers of the voice activity data groups input to the packet buffering unit, and also storing channel numbers to be read by priority from among the stored channel numbers;

a write controller for discriminating initial or last data of the voice activity data group, controlling a write operation of voice data of the voice activity data group into the packet buffering unit for each channel, and controlling a write operation of a channel number of the voice activity data group into the scheduler; and a read controller for selecting channel numbers not greater than the predetermined number of channels that can be multiplexed at a time, in an order of channel numbers stored in the scheduler and read out by priority, controlling a multiplexing sequence according to selected channel numbers, and outputting voice packets formed by multiplexing voice data of voice activity data groups corresponding to the selected channel numbers.

BRIEF DESCRIPTION OF THE DRAWINGS

FIG. 7 is a diagram for explaining changes of the internal state of the scheduling FIFO unit 52 at time A in FIG. 5;

FIG. 8 is a diagram for explaining changes of the internal state of the scheduling FIFO unit 52 at time B in FIG. 5;

FIG. 9 is a diagram for explaining changes of the internal state of the scheduling FIFO unit 52 at time C in FIG. 5;

FIG. 10 is a diagram for explaining changes of the internal state of the scheduling FIFO unit 52 at time D in FIG. 5;

DESCRIPTION OF THE PREFERRED EMBODIMENTS

(1) First Embodiment

Figure 1:
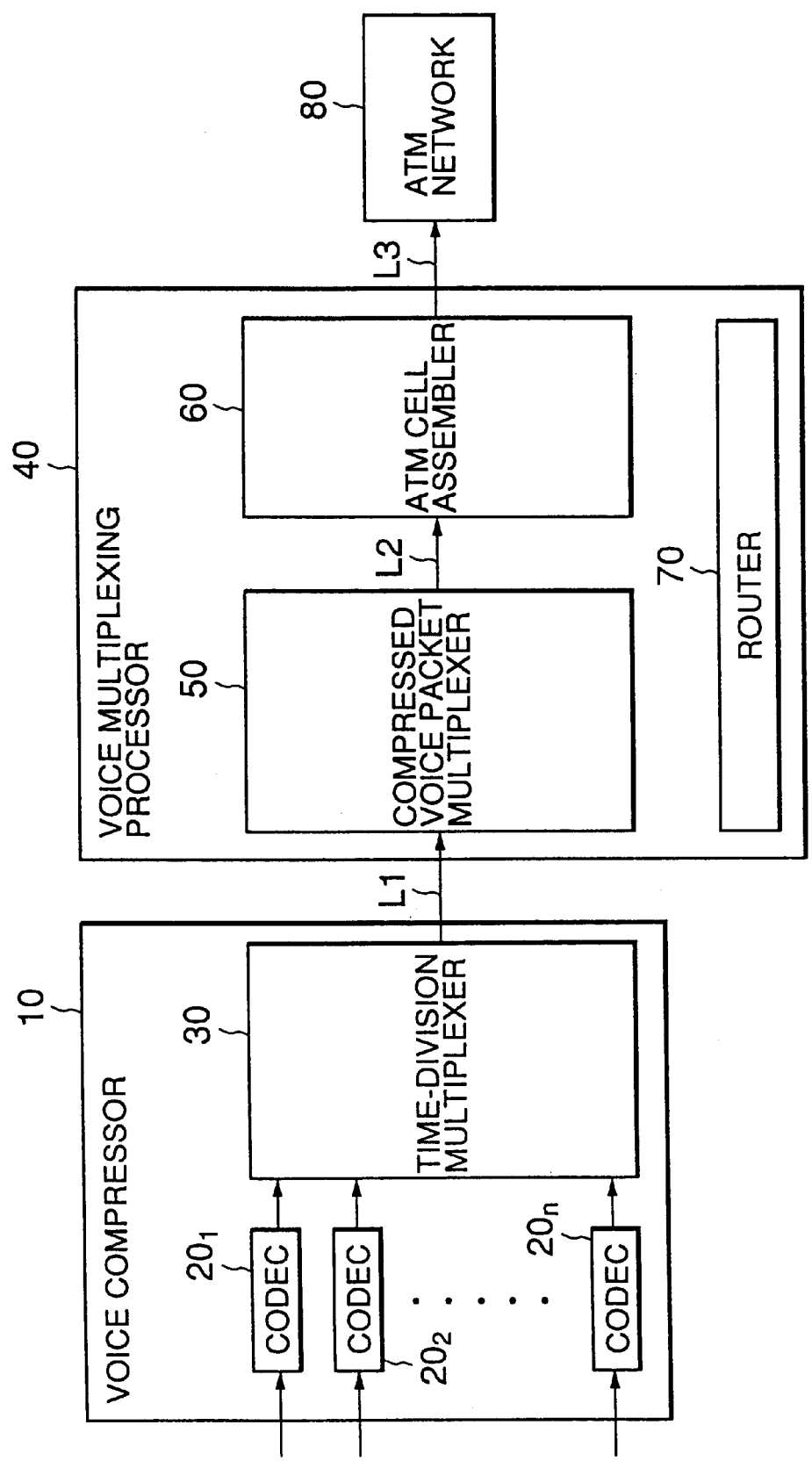
FIG. 1 is a system configuration diagram of a first embodiment of a voice packet multiplexing system according to the present invention.

FIG. 1 is a system configuration diagram of the first embodiment of the voice packet multiplexing system according to the present invention. This diagram shows an example in which the present invention is applied to a system that converts compressed voice data of a plurality of channels into an ATM cell. This system includes a voice compressor 10 for coding voice and a voice multiplexing processor 40 for multiplexing compressed voice data.

The voice compressor 10 includes CODECs $20_1$ to $20_n$ for compressing and coding PCM (Pulse Code Modulation) speech at 64 kbit/s for respective channels, and a time division multiplexer 30 for multiplexing compressed coded data in time division. The PCM voice signal at 64 kbit/s input to the voice compressor 10 undergoes necessary compression and coding processes, such as silence compression or low bit rate compression, by the CODECs $20_1$ to $20_n$, for the respective channels, so that the PCM voice signal is converted into compressed voice data. The compressed voice data output from the CODECs $20_1$ to $20_n$, is multiplexed in time division by the time division multiplexer 30, and delivered as compressed voice multiplexed data to the voice multiplexing processor 40, which outputs the data in bursts for every voice frame.

The voice multiplexing processor 40 includes a compressed voice packet multiplexer 50, an ATM cell assembler 60, and a router 70. Compressed voice data multiplexed and output from the voice compressor 10 undergoes a packet multiplexing process by the compressed voice packet multiplexer 50, multiplexed packets are assembled into ATM cells by the ATM assembler 60, and the ATM cells are output to an ATM network 80. At this time, a router 70 controls which channels are multiplexed through which VC (virtual channel) connections.

It is possible to apply this invention to a frame relay network by replacing the ATM cell assember 60 with a frame assembler. In this case, the frame assembler assembles sub-frames, multiplexed by the compressed voice packet multiplexer 50, to form a frame, and delivers it to the frame relay network. Similarly, it becomes possible to apply this invention to an IP (Internet Protocol) network, by replacing the ATM cell assembler 60 with an IP packet assembler. At this time, the IP packet assembler assembles IP short packets, multiplexed by the compressed voice packet multiplexer 50, to form a standard IP packet, and delivers it to the IP network. In this manner, the present invention can be applied to other networks.

Figure 2:
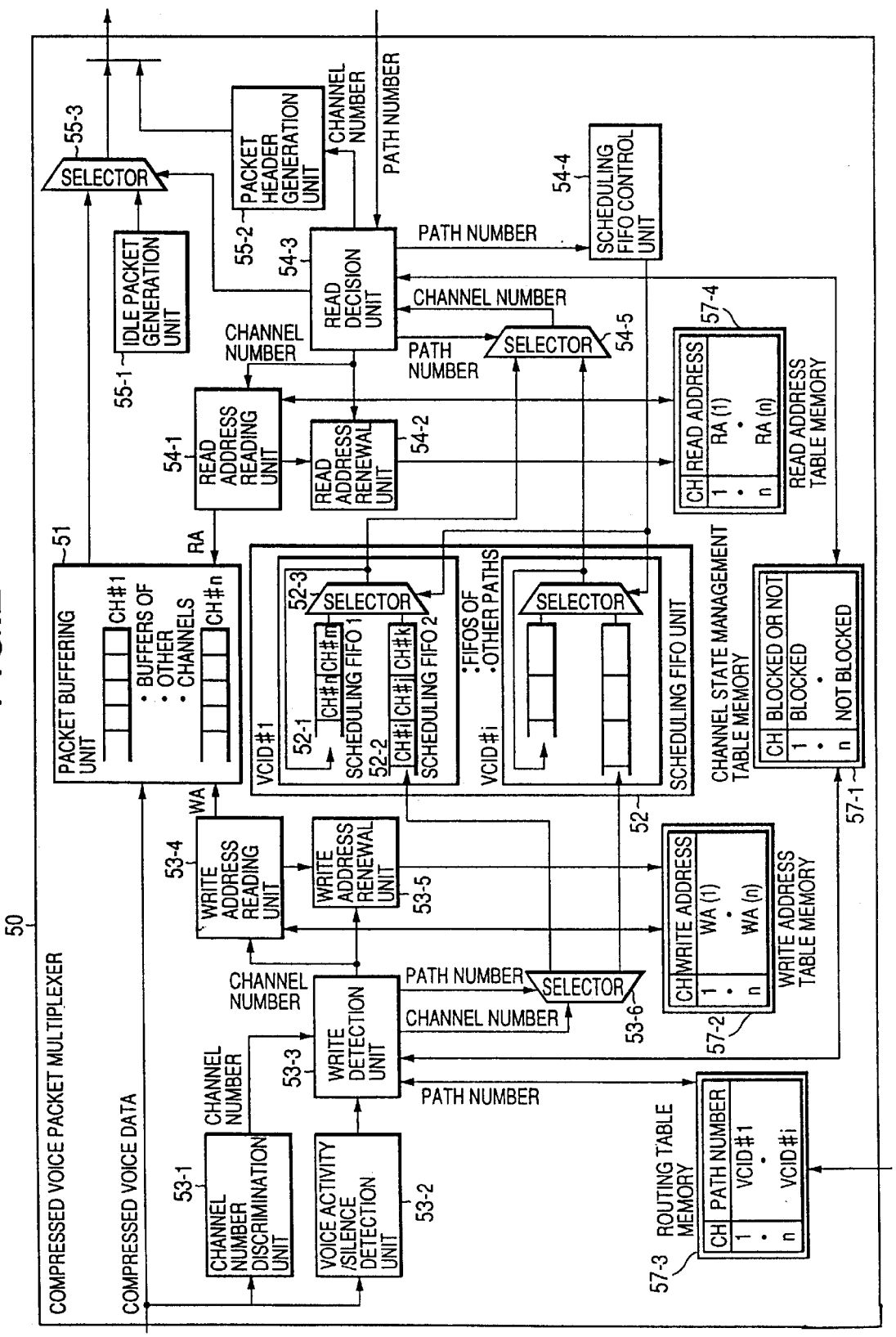
FIG. 2 is a block diagram of the first embodiment of the voice packet multiplexing system according to the present invention.

FIG. 2 is a block diagram of the first embodiment of the voice packet multiplexing system according to the present invention. FIG. 2 shows an example of the functional configuration of the compressed voice packet multiplexer 50 as an essential feature of the present invention.

The compressed voice packet multiplexer 50 includes a packet buffering unit 51 and a scheduling FIFO unit 52. When compressed voice data of a plurality of channels multiplexed in time division is formed into packets, the packet buffering unit 51 temporarily stores compressed voice data separated in the respective channels before the compressed voice packets are multiplexed with their output sequence adjusted. The scheduling FIFO unit 52 controls reading contention with regard to which channel should be read next among the compressed voice packets. In this case, the scheduling FIFO unit 52 has two kinds of FIFO units, a scheduling FIFO1 (52-1) and a scheduling FIFO2 (52-2) for separate output paths, and also a selector 52-3.

In the compressed voice packet multiplexer 50, as write control parts for controlling the write operation of compressed voice data into the packet buffering unit 51, there are provided a channel number discrimination unit 53-1, a voice activity/silence detection unit 53-2, a write decision unit 53-3, a write address reading unit 53-4, a write address renewal unit 53-5, and a selector 53-6. The channel number discrimination unit 53-1 discriminates the channel number of compressed voice data that arrives. There is a method for discriminating the channel based on the time slot position of the channel and a method for discriminating the channel based on channel number data included in a control signal. The voice activity/silence detection unit 53-2 detects if the input compressed voice data is voice activity data or silence data and also checks if it is the initial, intermediate or final data of the talk spurt, and so on. For example, the initial data of voice activity data can be discriminated by monitoring compressed voice data that arrives and by detecting a data change from silence to voice activity. The final data can be discriminated by checking if compressed voice data that arrives is SID (Silence Insertion Descriptor) data indicating the final data appears. Alternatively, because the byte length is varied such that ordinary data is ten bytes long and SID data is two bytes long, the final data can be discriminated by detecting byte length. When the initial data and the final data has been detected, data between them can be detected as the intermediate data.

On the other hand, as read control parts for controlling the read operation of compressed data from the packet buffering unit 51, there are provided a read address reading unit 54-1, a read address renewal unit 54-2, a read decision unit 54-3, a scheduling FIFO control unit 54-4, and a selector 54-5. The read decision unit 54-3 receives a path number from the router 70 in the voice multiplexing processor 40 or from another control unit or an external control unit, and according to the path number, controls the read operation of compressed voice data from the packet buffering unit 51. The scheduling FIFO control unit 54-4 controls the scheduling FIFO 52 (This operation will be described in detail later).

The compressed voice packet multiplexer 50 includes an idle packet generation unit 55-1, a packet header generation unit 55-2, and a selector 55-3 as output parts. The idle packet generation unit 55-1 generates idle packets. The packet header generation unit 55-2 generates packet headers. The selector 55-3 selects an idle packet or compressed voice data, which is read from the packet buffering unit 51. Thus, the read-out compressed voice data is divided into packets and multiplexed, and the compressed voice packets are output.

The compressed voice packet-multiplexer 50 includes a channel state management table memory 57-1, a write address table memory 57-2, a routing table memory 57-3, and read address table memory 57-4. The channel state management table memory 57-1 manages the state of each channel in the packet buffering unit 51. For example, the channel state management table memory 57-1 stores blocked state data about packet buffers of the respective channel numbers. The write address table memory 57-2 stores write addresses. The routing table memory 57-3 stores the output path numbers VCIDs #1 to #i of the respective channels. The routing table memory 57-3 stores the path numbers corresponding to the channels delivered from the router 70 in the voice multiplexing processor 40 or from another control unit or an external control unit. The read address table memory 57-4 stores the read addresses of the packet buffering unit 51. The operation of the compressed voice packet multiplexer 50 configured as described above will be explained with reference to the flowcharts of FIGS. 3 and 4.

Figure 3:
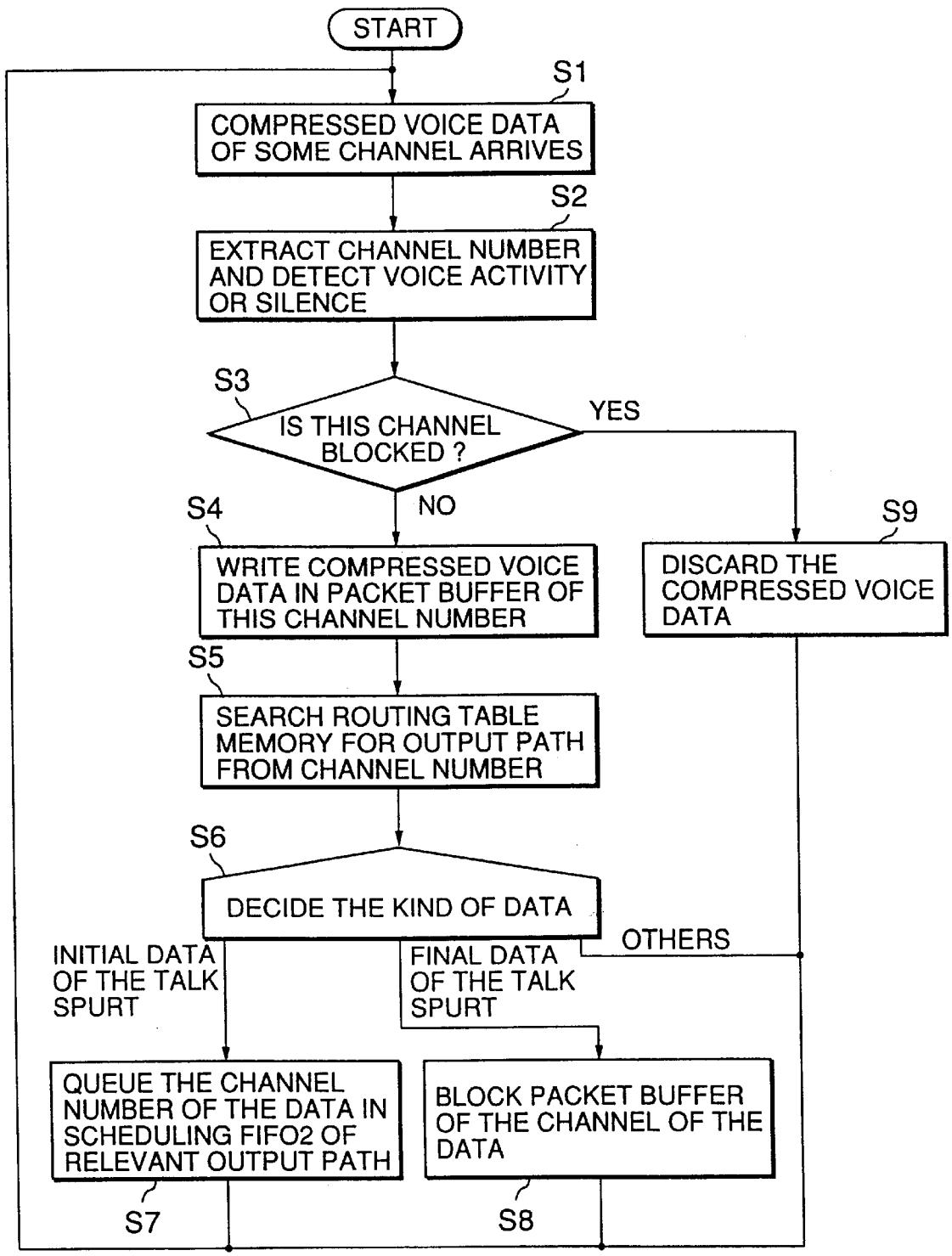
FIG. 3 is a flowchart showing the input operations of the compressed voice packet multiplexer according to the first embodiment.
Figure 4:
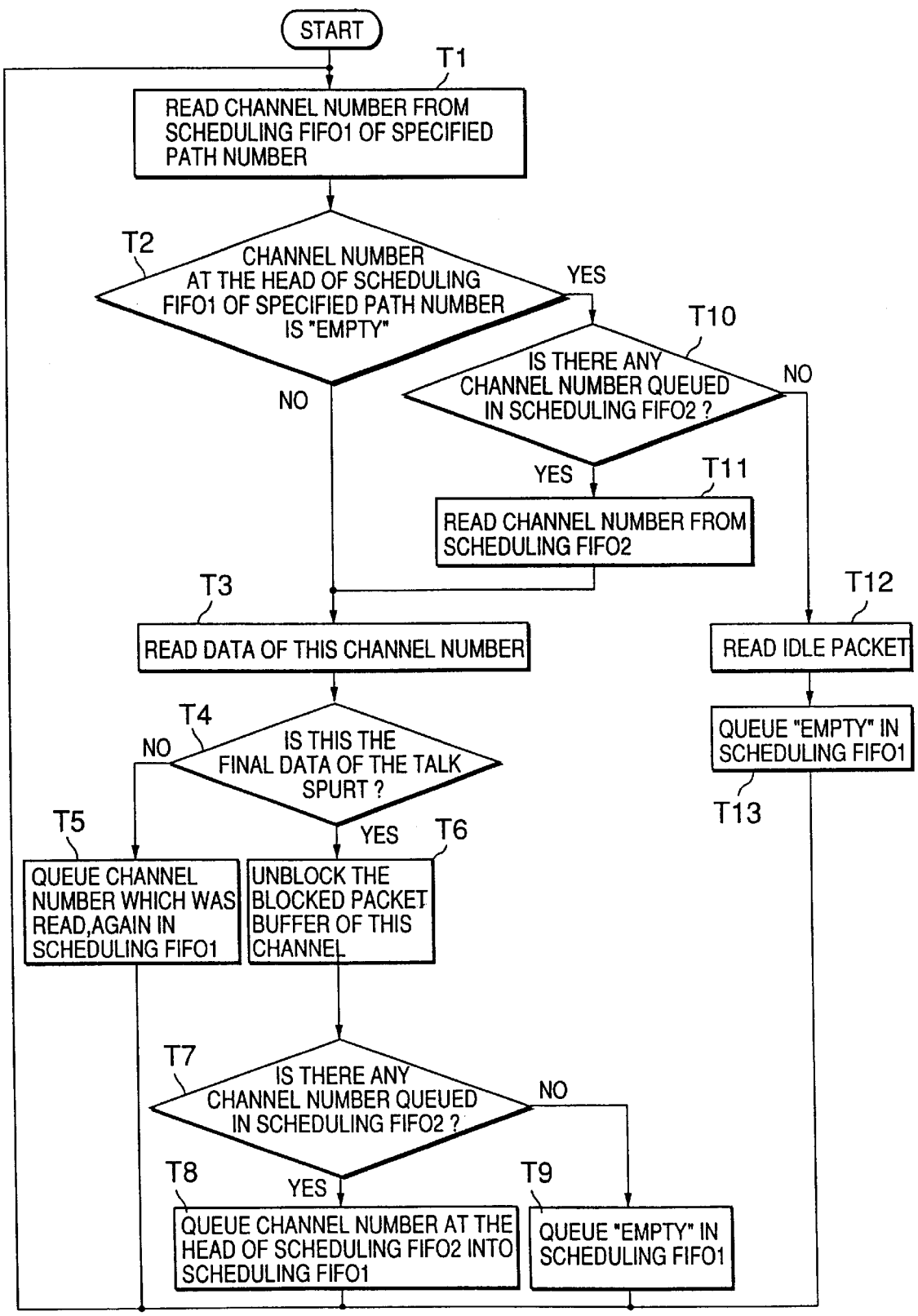
FIG. 4 is a flowchart showing the output operations of the compressed voice packet multiplexer according to the first embodiment.

FIG. 3 is a flowchart showing the input operations of the compressed voice packet multiplexer according to the first embodiment. This flowchart indicates the process steps of the compressed voice packet multiplexer when compressed voice data multiplexed in time division is input to this. FIG. 4 is a flowchart showing the output oeprations of the compressed voice packet multiplexer according to the first embodiment. This flowchart indicates the process steps of the compressed voice packet multiplexer according to the first embodiment when the compressed voice packet multiplexer 50 converts compressed voice data into multiplexed packets, and outputs the compressed voice packets to the ATM cell assember 60.

The operation when compressed voice data multiplexed in time division is input will be described with reference to FIG. 3. At step S1, compressed voice data of a certain channel number arrives at the compressed voice packet-multiplexer 50. At step S2, the channel number discrimination unit 53-1 discriminates the channel number of the arrived compressed voice data. Also at step S2, the voice activity/silence detection unit 53-2 detects whether the compressed voice data is voice activity or silence. Thus, a talk spurt of each channel can be detected.

At step S3, the write decision unit 53-3 searches the channel state management table memory 57-1 to see if writing into the packet buffer in the packet buffering unit 51, said packet buffer corresponds to the channel number of the arrived compressed voice data, is prohibited. If writing is prohibited at the packet buffer of that channel number (this packet buffer is said to be in the blocked state), the arrived compressed voice data is discarded at step S9. On the other hand, if the packet buffer of the channel number of the arrived compressed voice data is not blocked, the write address reading unit 53-4 at step S4 reads from the write address table memory 57-2, a write address to the packet buffering unit 51, and stores the arrived compressed voice data in the packet buffer of the channel number of this compressed voice data. The write address renewal unit 53-5 updates the write address in the write address table memory 57-2.

Next, at step S5, the write decision unit 53-3 searches the routing table memory 57-3 for the output path of the arrived compressed voice data. At step S6, the voice activity/silence detection unit 53-2 decides whether the arrived compressed voice data is the initial data, the final data or the intermediate data of the talk spurt. If the arrived compressed voice data is the initial data of the talk spurt, the write decision unit 53-3 at step S7 queues the channel number of the input compressed voice data in the scheduling FIFO2 (52-2) of the corresponding output path through the selector 53-6. If the arrived compressed voice data is the final data of the talk spurt, the write decision unit 53-3 at step S8 causes the packet buffer of the channel number of the arrived compressed voice data to be blocked in the packet buffering unit 51.

As described above, separate items of compressed voice data, which were arrived at the compressed voice packet-multiplexing block 50, from a plurality of channels are stored in the packet buffers of the related channel numbers in the packet buffering unit 51. If the arrived compressed voice data is the final data of the talk spurt, the packet buffer of the related channel number is placed in the blocked state to inhibit writing, it follows therefore that only compressed voice data of one talk spurt of one channel number is stored in the packet buffer of each channel number.

The operation when compressed voice data stored in the packet buffering unit 51 is read out will be described next with reference to FIG. 4. At step T1, the read decision unit 54-3 reads a channel number from the scheduling FIFO1 (52-1) of a specified path number. This path number can be specified from the router 70 in the voice multiplexing processor 40 or from another control unit or an external control unit. At the next step T2, a decision is made as to whether the channel number that was read out is an "empty" number.

If, at step T2, the channel number that was read is "empty", the scheduling FIFO control unit 54-4 at step T10 decides whether there or not is any channel number queued in the scheduling FIFO2 (52-2) of that corresponding path number.

If, at step T10, there is no channel number queued in the scheduling FIFO2 (52-2) of that corresponding path number, the read decision unit 54-3 reads an idle packet at step T12, generated by the idle packet generation unit 55-1, from the selector 55-3. At step T13, the scheduling FIFO control unit 54-4 queues an "empty" signal in the scheduling FIFO1 (52-1) of the corresponding path number. For queuing an "empty" signal in the scheduling FIFO1 (52-1), any applicable method can be used, such as providing an empty signal generating unit and selecting an "empty" signal through the selector 52-3 or inserting an "empty" signal directly from the scheduling FIFO control unit 54-4.

On the other hand, if, at step T10, there is some channel number queued in the scheduling FIFO2 (52-2) of the corresponding path number, the channel number is read by the read decision unit 54-3 from the scheduling FIFO2 (52-2) of that relevant path number at step T11.

If, at step T2, the channel number read from the scheduling FIFO 52 is not "empty", the read address reading unit 54-1 at step T3 reads a read address of this channel number from the read address table memory 57-4, and also reads compressed voice data of the relevant channel number from the packet buffering unit 51. In addition, the read address renewal unit 54-2 updates the address in the read address table memory 57-4.

At step T4, a decision is made as to whether or not the compressed voice data that was read is the final data of the packet buffer of that channel number. If the decision at step T4 is that the data is not the final one, the scheduling FIFO control unit 54-4 at step T5 again queues the channel number, which was read, in the scheduling FIFO1 (52-1) of the corresponding path number.

On the other hand, if the compressed voice data, which was read from the packet buffer, is the final data of the packet buffer of that channel number, the read decision unit 54-3 at step T6 releases the blocked state of the packet buffer of that channel number. At step T7, the scheduling FIFO control block 54-4 decides whether or not there is any channel number queued in the scheduling FIFO2 (52-2) of the corresponding path number. If there is no channel number in the scheduling FIFO2 (52-2), the scheduling FIFO control unit 54-4 queues an "empty" signal in the scheduling FIFO1 (52-1) of the corresponding path number at step T9. On the other hand, if there is any channel number queued in the scheduling FIFO2 (52-2), the scheduling FIFO control unit 54-4 removes the channel number from the leading end of the scheduling FIFO2 (52-2) and queues it in the scheduling FIFO1 (52-1) at step T8.

As has been described, the compressed voice packet multiplexer 50 reads compressed voice data from the packet buffer of the channel number read from the scheduling FIFO of a specified path number at every reading timing. The compressed voice packet multiplexer 50 adds a header generated by the packet header generation unit 55-2 to the compressed voice data that was read, thereby forming a packet, and outputs the packet to the ATM cell assembly unit 60.

As shown at steps T4 and T5, the channel numbers, which are queued temporarily in the scheduling FIFO1 (52-1), are continuously queued until all of compressed voice data in the packet buffers of those channel numbers is read out. More specifically, the compressed voice data in the packet buffers of the channel numbers queued in the scheduling FIFO1 (52-1) is always read out with priority over that of channel numbers queued in the scheduling FIFO2 (52-2).

In connection with the scheduling FIFO1 (52-1) and the scheduling FIFO2 (52-2) of the scheduling unit 52, the relation between the queue length and the input/output speed of the compressed voice packet multiplexer 50 will be described.

The queue length of the scheduling FIFO2 (52-2) can be set at a value equivalent to the number of channels actually multiplexed. For example, supposing that a compression algorithm of 8 kbit/s is used for voice compression and that the number of channels multiplexed for a certain path is 100, the input speed of the compressed voice packet multiplexer 50 is 800 kbit/s and the queue length of the scheduling FIFO2 (52-2) of the corresponding path number is set at 100.

Meanwhile, the queue length of the scheduling FIFO1 (52-1) is decided by the output speed of the compressed voice packet multiplexer 50 and the bandwidth of the output port, and so on. The queue length of the scheduling FIFO1 (52-1) corresponds to the number of speech spurts that can be multiplexed. For instance, in the above-mentioned example, if the output speed for a certain path in the compressed voice packet multiplexer 50 is 400 kbit/s, because the number of talk spurts that can be multiplexed at a time is 50 (400/8), the queue length of the scheduling FIFO1 (52-1) of the corresponding path number is set to be 50. (The overhead of the headers is ignored for the sake of convenience. In reality, the overhead needs to be taken into account.)

Figure 5:
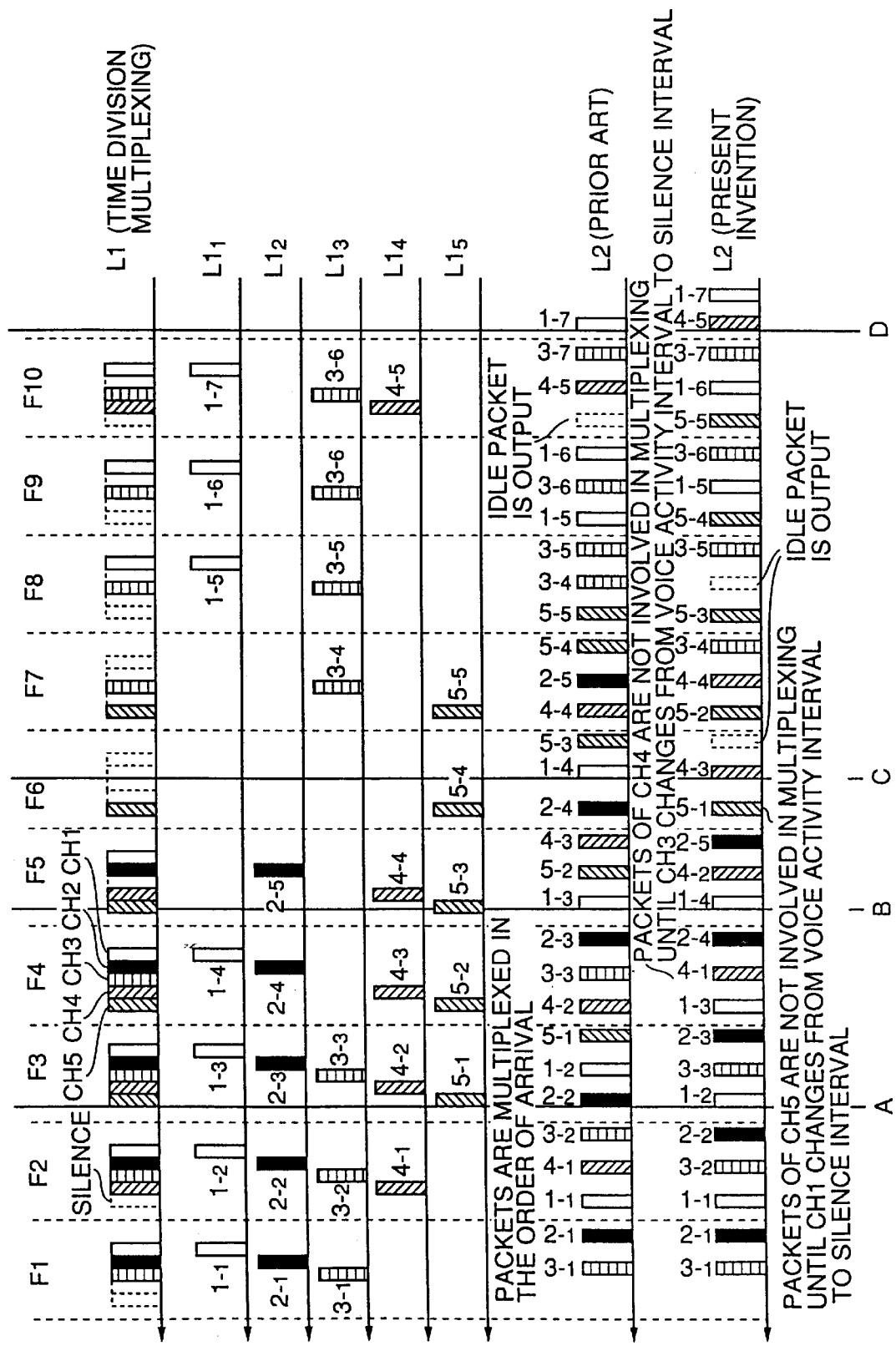
FIG. 5 is an input/output timing chart of the compressed voice packet multiplexing operation in the prior art and in the present invention.

FIG. 5 compares an input/output timing of the compressed voice packet-multiplexing operation between the prior art and the present invention. It is assumed that, as to a certain path, compressed voice data of five channels which has been multiplexed in time division, is input to the compressed voice packet multiplexer to form into packs. And the output speed after the packets from it is at a voice data rate of three channels per frame, with a silence rate of 40%.

Suppose that as shown at the multiplexed data input L1 in FIG. 5, compressed voice data of five channels is multiplexed in time division, and input to the compressed voice packet-multiplexer 50. $L1_1$, $L1_2$, $L1_3$, $L1_4$ and $L1_5$ indicate time-division-multiplexed data L1 as distributed separately to channel 1, channel 2, channel 3, channel 4, and channel 5. As shown in FIG. 5, at channel 1 ($L1_1$), talk spurts occur from frame F1 to frame F4, but a silence interval continues from frame F5 to frame F7, and talk spurts appear from frame F8 onwards. Similarly, talk spurts and silence intervals occur from channel 2 ($L1_2$) to channel 5 ($L1_5$) at timing as shown in FIG. 5. In this manner, compressed voice data and silence intervals are input to the compressed voice packet multiplexer 50.

In the prior art, compressed voice data is multiplexed in the order of arrival, with the result that the multiplexed packet stream L2 is output at timing as indicated by L2 (prior art) in FIG. 5. More specifically, compressed voice packets are output in an order starting with compressed voice packet 3-1, then 2-1, 1-1, 4-1, 3-2, 2-2, 1-2, 5-1 and so on. Therefore, in such a case where compressed voice data is input faster than the speed of output as in frames F1, F2, F3 and F4, the compressed voice data is made to wait before it is output, causing delay variations to occur between compressed voice packets of the respective channels.

In the meantime, according to the multiplexing method of the present invention, when the compressed voice data 3-1 of channel 3 ($L1_3$) arrives, because the compressed voice data 3-1 is the first data of the talk spurt, the channel number 3 is written in the scheduling FIFO2 (52-2) and the initial compressed voice data 3-1 to the final compressed voice data 3-3 of the successive talk spurts are buffered in the packet buffer of channel 3 of the packet buffering unit 51. Similarly, when the initial compressed voice data 2-1 and 1-1 of the talk spurts of channel numbers 2 and 1 arrive, their channel numbers 2 and 1 are written in the scheduling FIFO2 (52-2), and the compressed voice data 2-1 to 2-5 are buffered in the packet buffer of channel number 3 of the packet buffering unit 51 and the compressed voice data 1-1 to 1-4 are buffered in the packet buffer of channel number 1 of the packet buffering unit 51. In the case of compressed voice data of channel numbers 4 and 5, those channel numbers are written in the scheduling FIFO2 (52-2) and compressed voice data is buffered in the packet buffering unit 51.

At the reading side, the channel numbers 3, 2 and 1 are written in the scheduling FIFO1 (52-1), compressed voice data is read out in the order of channel numbers 3, 2 and 1 until data of the packet buffers runs out. After the final data 3-3 is read from the packet buffer of channel number 3, the channel number 4 is written in the scheduling FIFO1 (52-1), and data is read out in the order of channel numbers 2, 1 and 4. Similarly, after the final data 1-4 is read from the packet buffer of the channel number 1, the channel number 5 is transferred from the scheduling FIFO2 (52-2) to the scheduling FIFO1 (52-1), and data is read out in the order of channel numbers 4, 2 and 5. The compressed voice packet multiplexer 50, by controlling the read operation as described above, outputs multiplexed compressed voice packets by sending compressed data in the order of 3-1, 2-1, 1-1, 3-2, 2-2, 1-2, 3-3, 2-3, 1-3, 4-1, 2-4, 1-4, and so on as indicated by the multiplexed packet output L2 (the present invention).

Figure 6:
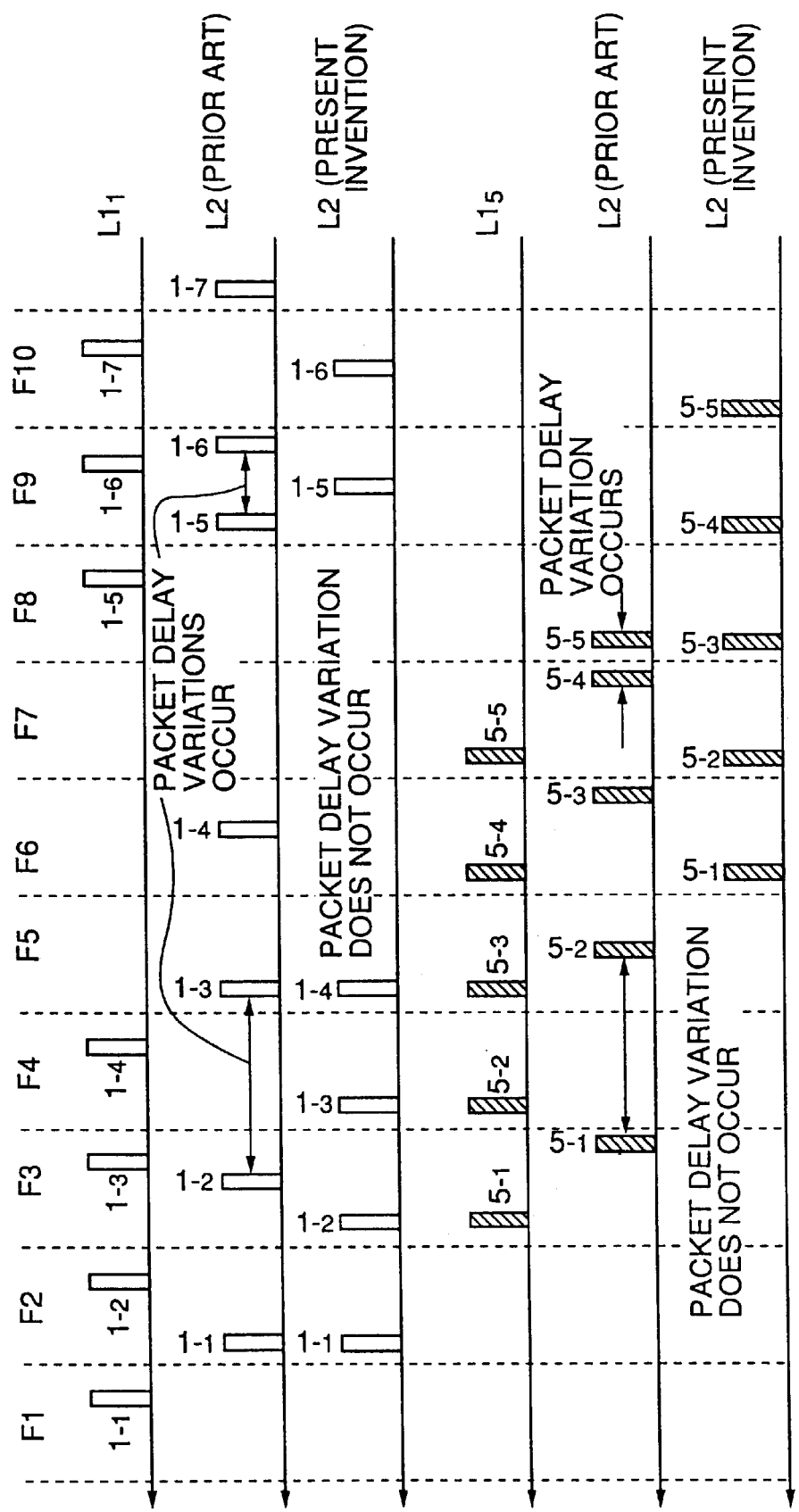
FIG. 6 is an input/output timing chart of the compressed voice packets in channel 1 ($L1_1$) and channel 5 ($L1_5$)

FIG. 6 shows input/output timing of compressed voice packets of channel 1 ($L1_1$) and channel 5 ($L1_5$). In the prior art, delay variations occur between the output compressed voice packets of channels 1 and 5. On the other hand, according to the multiplexing method of the present invention, the output start time of compressed voice packets of channel 5 is delayed, but the output compressed voice packets of channels 1 and 5 are free of delay variations.

FIGS. 7, 8 9 and 10 are diagrams for explaining changes in the internal state of the scheduling FIFO 52 at times A, B, C and D shown in FIG. 5.

As shown in FIG. 7, before reading data of channel 1 at time A, the channel number 1 is at the leading end of the scheduling FIFO1 (52-1), so that compressed voice data 1-2 of channel 1 is read. After data of channel 1 is read at time A, the channel number 1 is queued in the scheduling FIFO1 (52-1).

As shown in FIG. 8, before reading data of channel 1 at time B, the channel number 1 is at the leading end of the scheduling FIFO1 (52-1), and therefore compressed voice data 1-4 is read. At this point in time, because the compressed voice data 1-4 is the final data of the talk spurt, a decision is made as to whether or not there is any channel number queued in the scheduling FIFO2 (52-2). Because the channel number 5 is queued in the scheduling FIFO2 (52-2), after data of channel 1 has been read at time B, the channel number 5 is queued in the scheduling FIFO1 (52-1).

As shown in FIG. 9, before reading data of channel 2 at time C, the channel number 2 is at the leading end of the scheduling FIFO1 (52-1). Therefore, compressed voice data 2-5 of channel 2 is read. Because the compressed voice data 2-5 is the final data of the talk spurt, a decision is made as to whether or not there is any channel number queued in the scheduling FIFO2 (52-2). After data of channel 2 has been read at time C, because there is no channel number queued in the scheduling FIFO2 (52-2), an "empty" signal is queued in the scheduling FIFO1 (52-1).

As shown in FIG. 10, before "empty" is read at time D, the leading end of the scheduling FIFO1 (52-1) is "empty". Therefore, a decision is made as to whether or not there is any channel number queued in the scheduling FIFO2 (52-2). Because the channel number 4 is queued in the scheduling FIFO2 (52-2), after "empty" has been read at time D, compressed voice data 4-5 is read from the packet buffer of channel 4, and the channel number 4 is queued in the scheduling FIFO1 (52-1).

In the present invention, in a case where compressed voice data is input faster than the speed of output, elements of compressed voice data are multiplexed in the order of start times of talk spurts of the different channels, and the talk spurt that arrived late are delayed when they are output until the output of the talk spurt arrived earlier is completed, thus eliminating delay variations between the compressed voice packets.

(2) Second Embodiment

In the foregoing, description has been given of a case where multiplexed compressed voice data are input to the voice multiplexing processor. Another mode of embodiment will be discussed in which a voice compressor and a compressed voice packet multiplexer are provided for each output path and compressed voice data is input to the voice multiplexing processor without being multiplexed.

Figure 11:
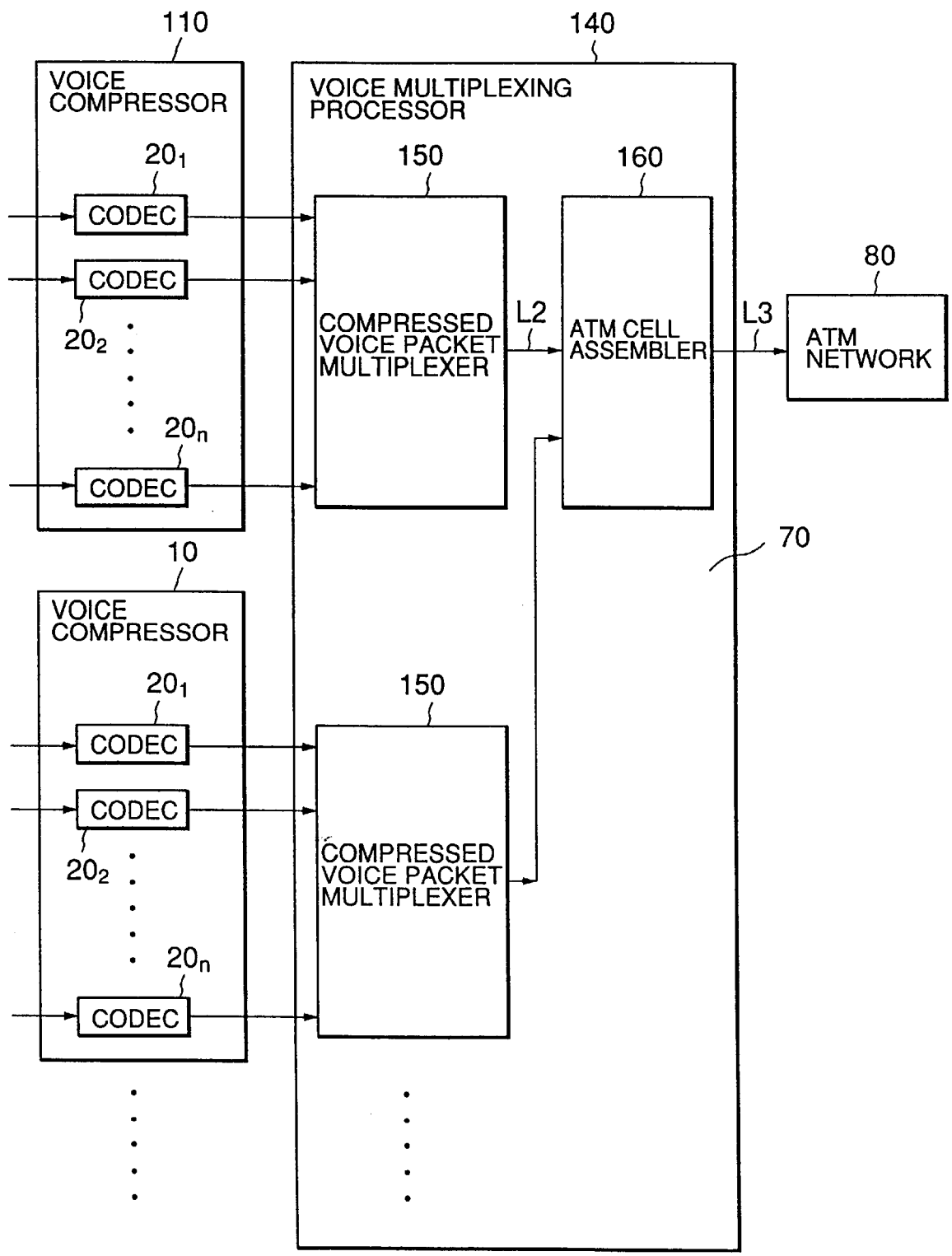
FIG. 11 is a system configuration diagram of a second embodiment of the voice packet multiplexing system according to the present invention.

FIG. 11 is a system configuration diagram of the second embodiment voice packet multiplexing system. This system includes a voice compressor 110 for coding voice or sound and a voice multiplexing processor 140 for multiplexing compressed voice data. The voice compressor 110 includes CODECs $20_1$ to $20_n$ for coding PCM sound of 64 kbit/s for each channel. The voice multiplexing processor 140 includes compressed voice packet-multiplexer 150 corresponding to the number of output paths, and a common ATM cell assembler 160. Unlike in the first embodiment, the compressed voice packet multiplexing units 150 are provided in one-to-one correspondence with the respective output paths. The compressed voice packet multiplexing units 150 corresponding to the output paths are connected to the common ATM cell assembler 160, and output data are formed into cells. The component parts have substantially the same functions as those used in the first embodiment.

Figure 12:
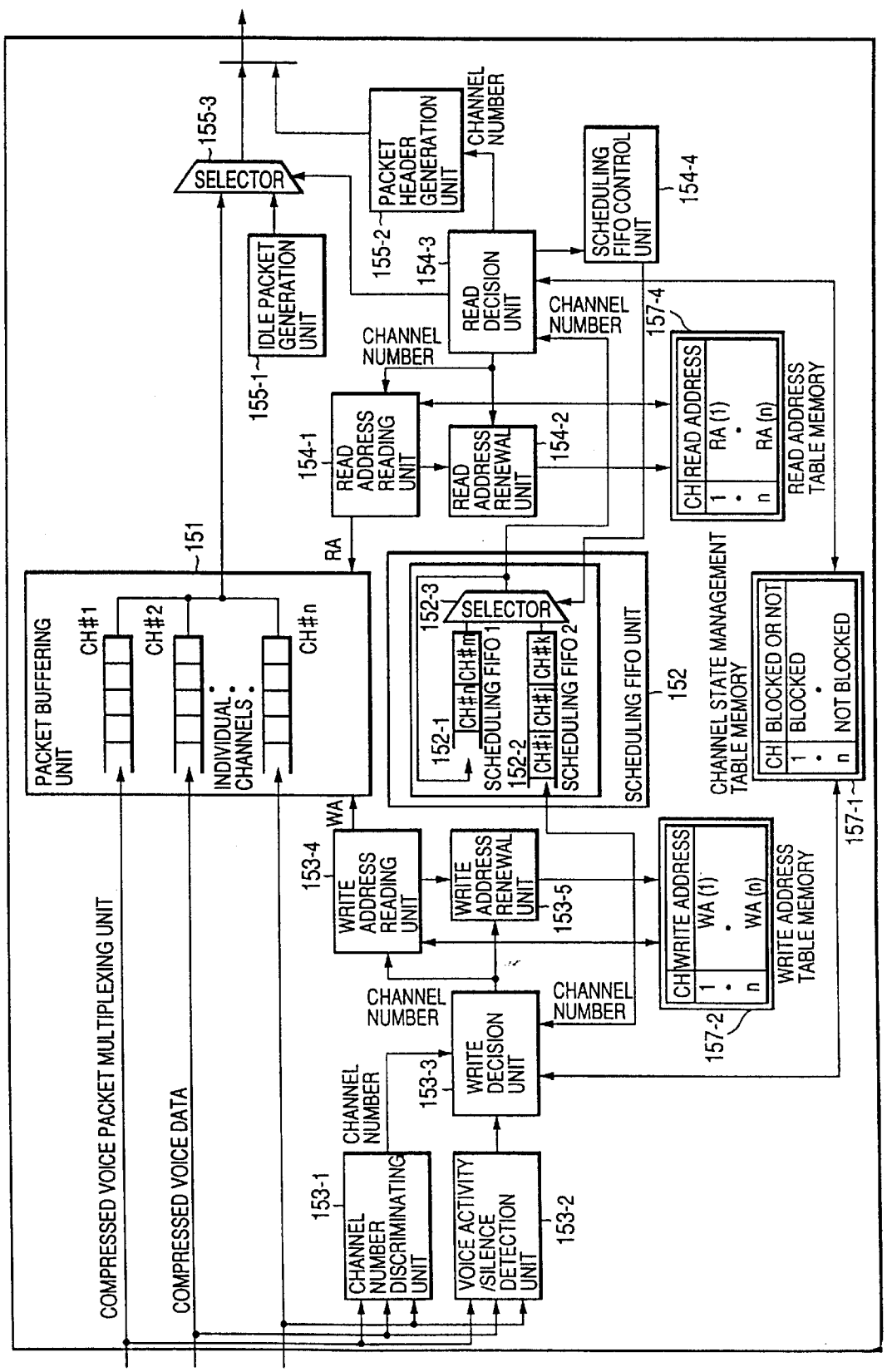
FIG. 12 is a block diagram of the second embodiment of the voice packet multiplexing system according to the present invention.

FIG. 12 is a block diagram of the second embodiment of the voice packet multiplexing system according to the present invention. FIG. 12 shows an example of the functional configuration of the compressed voice packet-multiplexer 150, which is the essential feature of the present invention.

The compressed voice packet-multiplexer 150 includes a packet buffering unit 151, a scheduling FIFO 152, and so on. In the second embodiment, the compressed voice packet-multiplexer 150 includes one scheduling FIFO 152 because its output path has been decided. As in the first embodiment, the scheduling FIFO 152 contains two kinds of FIFOs, namely, a scheduling FIFO1 (152-1) and a scheduling FIFO2 (152-2), and also a selector 152-3.

As write control parts for controlling the write operation of compressed voice data to the packet buffering unit 151, the compressed voice packet multiplexer 150 includes a channel number discrimination unit 153-1, a voice activity/silence detection unit 153-2, a write decision unit 153-3, a write address reading unit 153-4, and a write address renewal unit 153-5. On the other hand, as read control parts for controlling the read operation of compressed voice data from the packet buffering unit 151, the compressed voice packet multiplexer 150 includes a read address reading unit 154-1, a read address renewal unit 154-2, a read decision unit 154-3, and a scheduling FIFO control unit 154-4. As output parts, there are provided an idle packet generation unit 155-1, a packet header generation unit 155-2, and a selector 155-3. Moreover, as memory parts, there are provided a channel state management table memory 157-1, a write address table memory 157-2, and a read address table memory 157-4. The channel number discrimination unit 153-1 and the voice activity/silence detection unit 153-2 are substantially the same as in the first embodiment with one exception that the respective elements of compressed voice data are input in parallel. The component parts of the second embodiment have substantially the same functions as in the first embodiment, except that the control lines of output path numbers are not used.

The operation of the compressed voice packet-multiplexing block 150 configured as mentioned above will be described with reference to the flowcharts in FIGS. 13 and 14.

Figure 13:
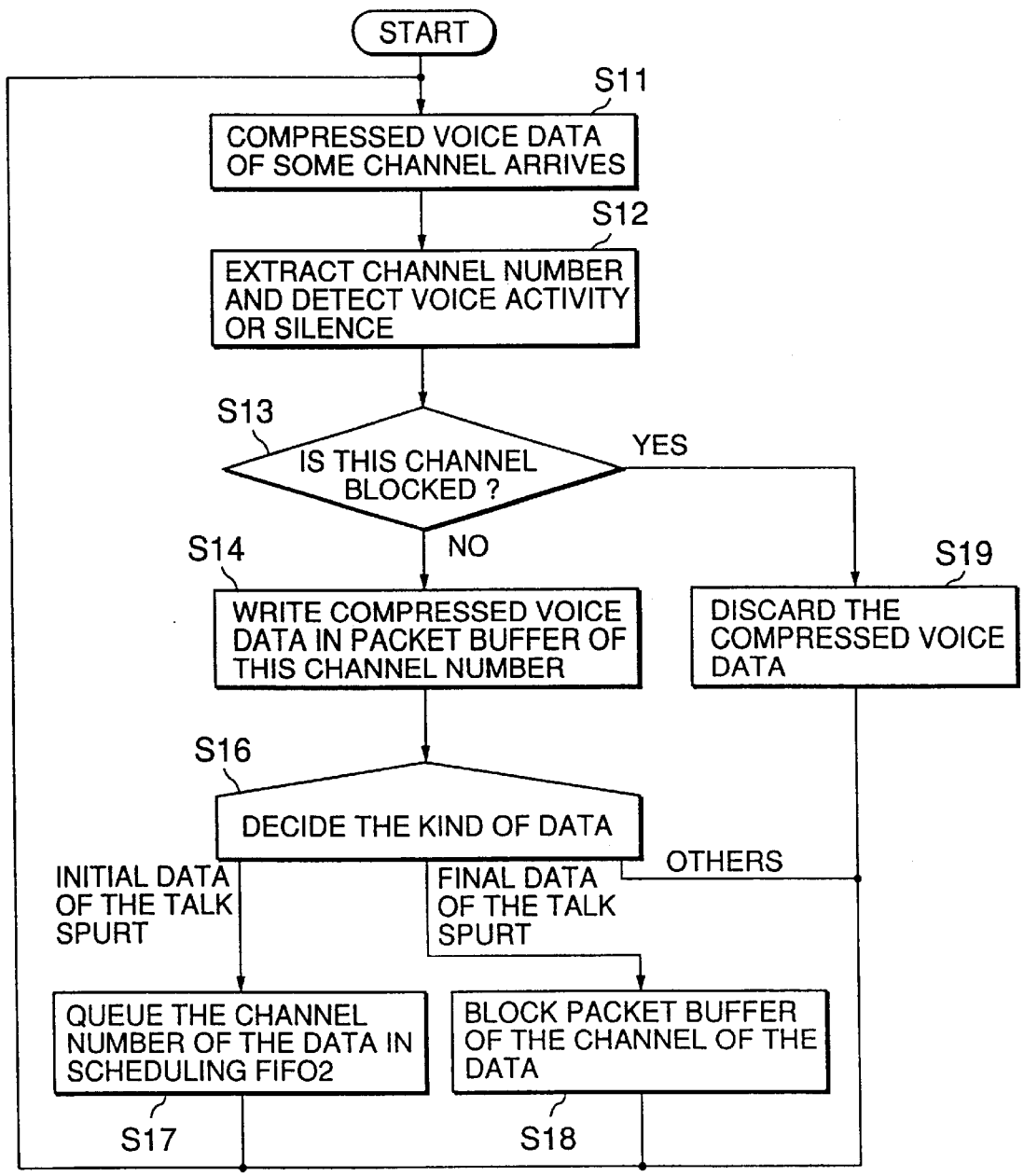
FIG. 13 is a flowchart showing the input operations of the compressed voice packet multiplexer according to the second embodiment.
Figure 14:
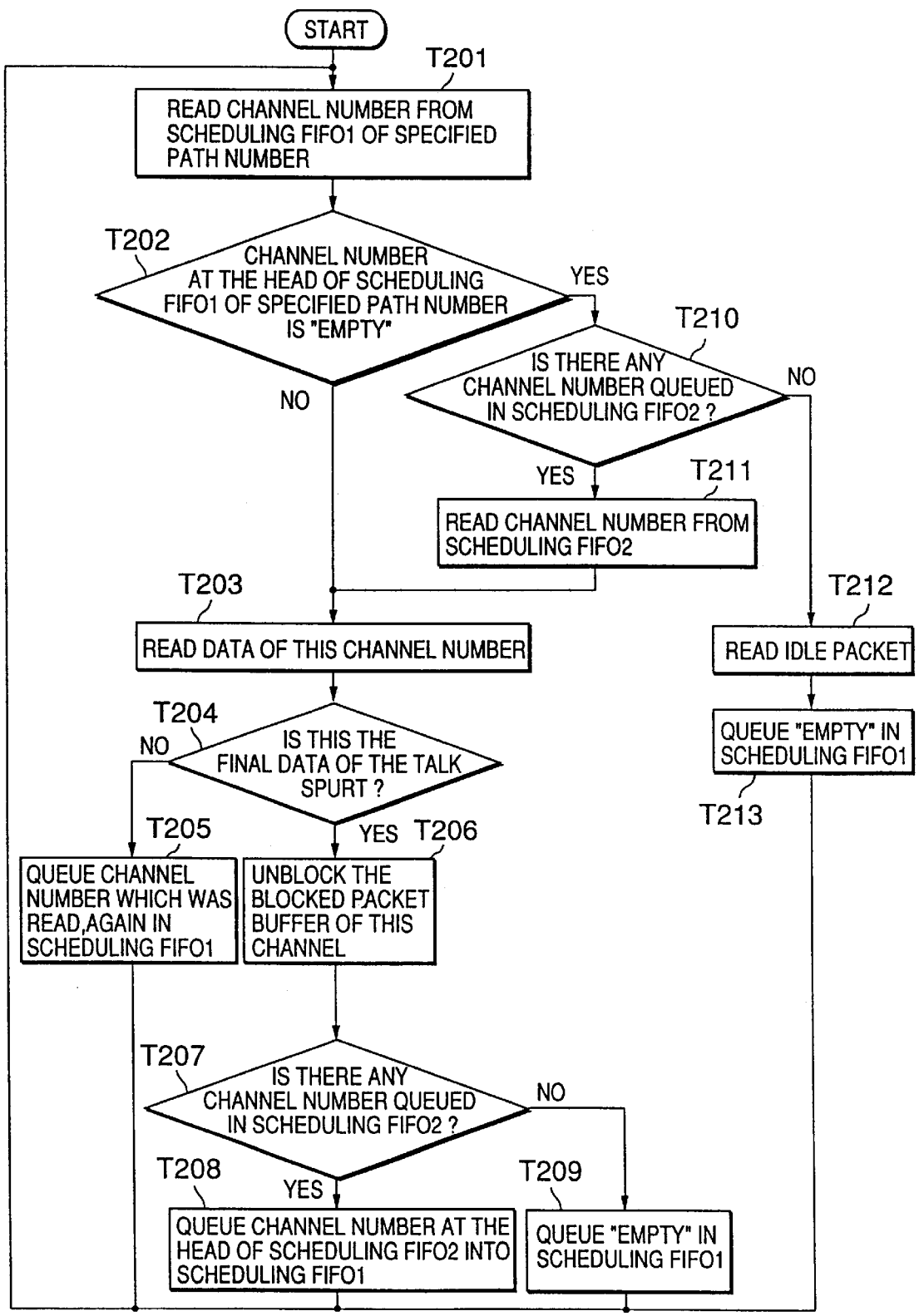
FIG. 14 is a flowchart showing the output operations of the compressed voice packet multiplexer according to the second embodiment.
Figure 15:
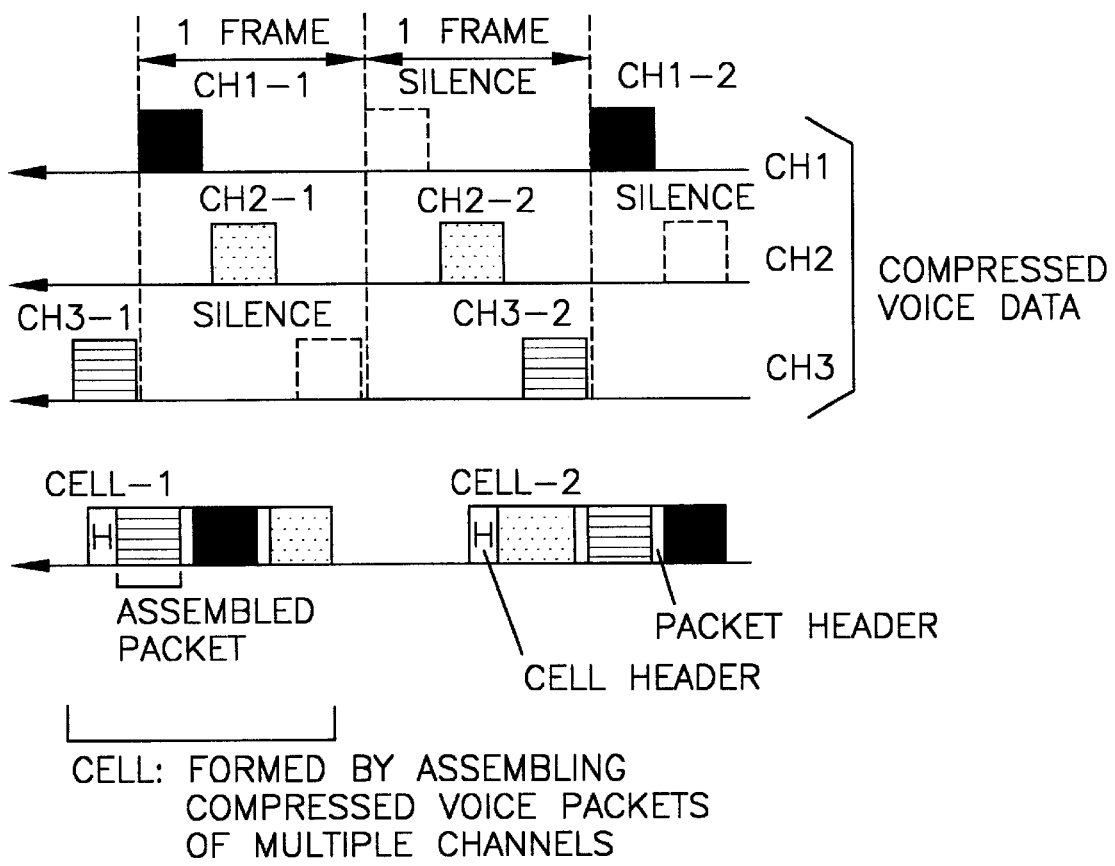
FIG. 15 is a diagram for explaining the operation of multiplexing silence compressed voice packets in the prior art.

FIG. 13 is a flowchart showing the input operations of the compressed voice packet multiplexer according to the second embodiment. FIG. 14 is a flowchart showing the output operations of the compressed voice packet multiplexing unit according to the second embodiment. The difference from the first embodiment is that, in the second embodiment, a voice compressor and a compressed voice packet multiplexer are provided for each path number, and therefore each voice multiplexing processor has its output path specified by an internal or external control unit.

The operation when time-division-multiplexed compressed voice data is input will be described with reference to FIG. 13. The processess from when compressed voice data of a certain channel number arrives at the compressed voice packet multiplexer 150 at step S11 until step S14, and the compressed voice data discarding process at step S19 are the same as in the first embodiment.

When the corresponding channel has not been blocked at S13, the voice activity/silence detection unit 153-2 at step S16 decides whether or not the arrived compressed voice data is the initial, final or intermediate data of the talk spurt. If the arrived compressed voice data is the initial data of the talk spurt, the write decision unit 153-3 at step S17 queues the channel number of the arrived compressed voice data, in the scheduling FIFO2 (152-2). If the arrived compressed voice data is the final data of the talk spurt, the write decision unit 153-3 at step S18 causes the packet buffer of the channel number of the input compressed voice data to be blocked in the packet buffering unit 151.

Compressed voice data input from a plurality of channels to the compressed voice packet multiplexing unit 150 are buffered in the buffers of the respective channels in the packet buffering unit 151.

The operation of reading compressed voice data buffered in the packet buffering unit 151 will be described with reference to FIG. 14. At step T201, the read decision unit 154-3 reads a channel number from the scheduling FIFO1 (152-1). At step T202, a decision is made as to whether or not the channel number that was read is "empty". The subsequent steps are the same as in the first embodiment.

As described above, the compressed voice packet multiplexer 150, at each read timing, reads compressed voice data from the packet buffer of the channel number read from the scheduling FIFO 152. The compressed voice data that was read is added with a header generated by the packet header generation unit 155-2 and thus becomes a packet, and each packet is output to the ATM cell assembler 160.

According to the present invention, by following the steps shown in the first and the second embodiments described above, the compressed voice packets can be multiplexed by superposing the talk spurts of the respective channels. The number of talk spurts which can be multiplexed is set in the compressed voice packet multiplexer 50 according the output speed on the respective paths, the bandwidth of the output port, for example. In addition, when talk spurts are input, which are greater than the number of talk spurts than can be multiplexed at a time, those talk spurts that arrive late are delayed when they are output. Therefore, the delay variations between the compressed voice packets, which occur when they are multiplexed, can be minimized. The delay time does not pose any problem because it is shorter than that during silence intervals.

In the above embodiments, description has been given of the case where compressed voice data is multiplexed. However, the present invention can be applied suitably to data that occurs in bursts, such as various kinds of compressed voice data or uncompressed voice data, including sound data.

Moreover, in the above embodiments, the voice compressor and the voice multiplexing processor may be those which can be realized by hardware by using logic ICs, such as ASICs and FPGAs, or those which can be obtained by software by a CPU executing specified programs loaded in memory. In this case, specified programs may be supplied by portable media, such as a CD-ROM.

As has been described, according to the present invention, when voice packets of a plurality of channels are multiplexed, delay variations can be prevented from occurring among the compressed voice packets of each channel even if the number of talk spurts multiplexed is increased for higher line utilization. In other words, according to the present invention, a decision is made as to whether or not talk spurts are superposed when the packets are multiplexed, and the multiplexed packets can be prevented from being output faster than the bandwidth of the output port. Further, delay variations can be removed from the compressed voice data in talk spurts in each channel. On top of that, according to the present invention, the buffer capacity for damping out the delay variations on the receiving side can be reduced without deteriorating voice quality on the receiving side.

What is claimed is:

1. A packet multiplexing method for receiving and multiplexing variable length packet streams including a plurality of packets having an initial packet and a final packet, through a plurality of lines, said method comprising the steps of:

selecting lines from said plurality of lines carrying corresponding initial packets, the number of said selected lines is not greater than a predetermined multiplexing number;

determining a multiplexing sequence for the packet streams that are received through the selected lines;

multiplexing the packets included in the packet streams according to the determined multiplexing sequence, wherein when the final packet of one of the selected lines is multiplexed, a new line having an initial packet is selected for replacing the one of the selected lines that's final packet has been multiplexed;

determining a new multiplexing sequence for the packet streams that are received through the selected lines, including the newly selected line; and multiplexing the packets included in the packet streams according to the newly determined multiplexing sequence.

2. A packet multiplexing method according to claim 1, wherein said packet streams are variable length voice activity data groups that include voice data during voice activity intervals.

3. A packet multiplexing method according to claim 1, wherein when the number of the lines through which the initial packets are received is greater than the predetermined multiplexing number, said selection step selected lines, the number of which is the predetermined multiplexing number according to a receiving order of the initial packets, and delays selection of an unselected line through which the initial packet is received until a final packet is received through one of the selected lines.

4. A packet multiplexing method according to claim 1, wherein the predetermined multiplexing number is set according to a bandwidth of an output port.

5. A packet multiplexing method according to claim 1, further comprising the steps of:

as to each of the lines, storing packets of the packet stream that are received through the line concerned, and when packets of a next packet stream are received through the same line, discarding the stored packets of the packet stream.

6. A packet multiplexing method according to claim 1, wherein said selecting step includes:

sequentially storing line numbers of lines through which the packet streams are received;

selecting line numbers, the number of which is not greater than the predetermined multiplexing number, out of the stored line numbers, according to an order of the stored line numbers; and when all of the packets included in the packet stream that are received through the line whose line number is selected, a new line number is selected for replacing the selected line number out of the stored and unselected line numbers.

7. A packet multiplexing system for receiving and multiplexing variable length packet streams including a plurality of packets having an initial packet and a final packet, through a plurality of lines, comprising:

a buffer memory that stores the packets that are received through the plurality of lines; and a controller that controls writing and reading of the packets to and from the buffer memory for each of the packet streams, wherein said controller is configured to:

write and store an identifier of one of the plurality of line lines and the packets that are received through that line, when the initial packet is received;

select lines from the plurality of lines having corresponding initial packets, the number of said selected lines is not greater than a predetermined multiplexing number, out of the lines whose identifiers are stored;

determine a multiplexing sequence of the packet streams that are received through the selected lines, and read the packets from the buffer memory according to the determined multiplexing sequence, wherein when the final packet of the packet stream, received through one of the selected lines is read from the buffer memory, the controller selects a new line having an initial packet for replacing the one of the selected lines that's final packet has been multiplexed and whose identifiers are stored, determine a new multiplexing sequence of the packet streams that are received through the selected lines, including the newly selected line; and read the packets from the buffer memory according to the newly determined multiplexing sequence.

* * * * *